US010953693B2

(12) United States Patent
Thorpe

(10) Patent No.: US 10,953,693 B2
(45) Date of Patent: Mar. 23, 2021

(54) LOCKING DEVICE FOR BICYCLE WHEEL QUICK RELEASE MECHANISM

(71) Applicant: Karbon Kinetics Limited, Surrey (GB)

(72) Inventor: Richard Brian Thorpe, Surrey (GB)

(73) Assignee: Karbon Kinetics Limited, Surrey (GB)

(*) Notice: Subject to any disclaimer, the term of this patent is extended or adjusted under 35 U.S.C. 154(b) by 274 days.

(21) Appl. No.: 15/777,229

(22) PCT Filed: Nov. 21, 2016

(86) PCT No.: PCT/GB2016/000207
§ 371 (c)(1),
(2) Date: May 18, 2018

(87) PCT Pub. No.: WO2017/085444
PCT Pub. Date: May 26, 2017

(65) Prior Publication Data
US 2018/0326783 A1    Nov. 15, 2018

(30) Foreign Application Priority Data

Nov. 20, 2015 (GB) ..................................... 1520468

(51) Int. Cl.
*B60B 7/16* (2006.01)
*B60B 27/02* (2006.01)
(Continued)

(52) U.S. Cl.
CPC .............. *B60B 27/026* (2013.01); *B60B 7/16* (2013.01); *B62K 25/005* (2013.01); *B62K 25/08* (2013.01);
(Continued)

(58) Field of Classification Search
CPC .............................. B62K 25/005; B62K 25/02; B62K 2025/047; B62H 5/001; B62D 43/007;
(Continued)

(56) References Cited

U.S. PATENT DOCUMENTS 2,070,993 A    2/1937    McDonald
2,205,301 A    6/1940    Martin
(Continued)

FOREIGN PATENT DOCUMENTS

EP    1618034    1/2006
GB    400824    11/1933

OTHER PUBLICATIONS

International Searching Authority., International Search Report and Written Opinion dated Feb. 21, 2017 for PCT Application No. PCT/GB2016/000207 Filed Nov. 21, 2016, 9 pages.

*Primary Examiner* — Jason R Bellinger
(74) *Attorney, Agent, or Firm* — Brooks, Cameron & Huebsch, PLLC

(57) ABSTRACT

There is described a quick-release arrangement for mounting a bicycle wheel (2) to a hub of a bicycle frame (1) using a single-sided mount. The quick-release arrangement includes a number of levers (12) each movable between a closed position, in which the wheel is retained to the bicycle hub, and an open position in which the wheel is freely removable. A locking ring (21) is mounted to the bicycle wheel and is rotatable between an open position and a locked position. When the locking ring (21) is in the locked position, hooks (24) on the locking ring (21) are engageable with pins (26) mounted on the levers (12), to prevent the levers (12) from moving out of their closed positions. The locking ring (21) may be mounted to a lever cover plate (18) which is fixed to the wheel and arranged so as to partially cover the levers (12) when they are in their closed positions. The lever cover plate (18) may have a window (27) through which an indicator is visible to indicate the position of the locking ring (21).

17 Claims, 8 Drawing Sheets

(51) Int. Cl.
  *B62K 25/00* (2006.01)
  *B62K 25/08* (2006.01)
  *B60B 1/00* (2006.01)
  *B60B 3/16* (2006.01)
  *B62K 25/20* (2006.01)

(52) U.S. Cl.
  CPC ............... *B60B 1/003* (2013.01); *B60B 3/16* (2013.01); *B62K 25/20* (2013.01); *B62K 2206/00* (2013.01)

(58) Field of Classification Search
  CPC ........... B60B 7/16; B60B 37/10; B60B 27/02; B60B 27/023; B60B 27/026; B60B 27/06; B60B 27/065
  See application file for complete search history.

(56) References Cited

U.S. PATENT DOCUMENTS

| | | | |
|---|---|---|---|
| 2,409,602 A | 10/1946 | Vogt | |
| 4,114,409 A | 9/1978 | Scire | |
| 4,925,249 A * | 5/1990 | Auspelmyer | B60B 3/14 301/111.01 |
| 6,722,744 B1 * | 4/2004 | Shieh | B62B 1/04 301/111.01 |
| 7,607,740 B2 * | 10/2009 | Reese | B60B 3/14 301/105.1 |
| 7,708,297 B2 * | 5/2010 | Thorpe | B60B 3/14 280/261 |
| 8,540,322 B2 * | 9/2013 | Thorpe | B60B 3/14 301/110.5 |

* cited by examiner

LOCKING DEVICE FOR BICYCLE WHEEL QUICK RELEASE MECHANISM

Within the field of bicycles, bicycle wheels can be attached to the bicycle frame by threaded axle and nut or by a so called "quick release" mechanism. With respect to the threaded axle and nut attachment, the wheel hub has a threaded central axle with protruding ends in order to receive a nut which is tightened to secure the wheel hub to the bicycle frame. The benefit of this method of attachment is that it is robust and when tightened appropriately the rider does not generally have to check the attachment of the wheel to the bicycle frame as part of a pre-ride safety check. The drawback of this threaded axle and nut fastening mechanism is that it requires tools and is inconvenient to detach or attach the bicycle wheel to the bicycle frame for example if the user wanted to transport or store the bicycle.

The so called "quick release" mechanism enables tool-free and convenient detachment and attachment of a bicycle wheel to the bicycle frame and is widely used and well understood. A bicycle wheel quick release generally comprises a lever that the user can open or close by hand requiring no special tools and through this process, the lever will affect the clamping force of the wheel attachment to the frame. In the open position, the quick release mechanism will be loose and the wheel can easily be detached from the frame. In the closed position, the wheel is held tightly and securely with a high clamping force between the wheel quick release mechanism and the bicycle frame. The lever will have a generally threaded fastener type means for adjusting the clamping force holding the wheel onto the bicycle frame. The benefit of the quick release mechanism is that the user can easily and conveniently detach or attach the bicycle wheel to the bicycle frame without requiring tools.

To operate effectively, bicycle quick release mechanisms need to be adjusted appropriately and the lever needs to be in the closed position. However, there are a many situations in which the integrity of the bicycle quick release mechanism may be compromised such that during normal riding the wheel could become detached from the bicycle posing a risk of injury to the rider. For example, the bicycle quick release can become loose due to road vibrations or impact from debris during normal riding. Quick release levers are intended to be easy and convenient to open and close without the use of tools, and therefore could be opened such as during regular maintenance of the bicycle and inadvertently not closed again prior to riding. In other cases, for example if the bicycle is stored and accessible to young children, a child could open the quick release lever whilst being inquisitive or playing. In other cases, the user could omit to adjust the quick release in accordance with the manufacturer's guidelines or the quick release lever could be tampered with by a third party.

In order to address problems arising from the above scenarios and ensure the integrity of the quick release mechanism whilst riding, the user is required to perform a pre-ride safety check of each quick release lever to ensure that they are correctly adjusted and in the closed position. This is done by physically opening and closing the lever to check it has the appropriate tension, and then visually to check that the lever is in the fully closed position.

The vast majority of bicycle wheels are mounted on axles which connect to the bicycle frame on both sides of the wheel hub. The front wheel is mounted in a generally fork-like frame element, while the rear wheel is mounted between a pair of wheel hangers attached to the frame. These so called "double side mounted wheels" may be provided with a quick release mechanism on each wheel, in the form of a tension rod that is concentric with the wheel rolling axis and passes through the centre of the wheel axle. A tightening cam at one end of the tension rod and a locknut at the other end of the tension rod engage the bicycle frame to clamp the wheel to the frame when the cam is in the closed position. By rotating the cam out of the closed position, tension in the rod is relaxed and the clamping released.

Some modern bicycles are designed with so called "single-side mounted" wheels whereby each wheel is mounted to a hub carrier which is rotatably mounted on an axle fixed to the frame. The axle is fixed to the frame at only one end, leaving the other end free so that the wheel may be mounted by fitting it over the free end of the hub carrier. For rapid mounting and the mounting of the wheel to the hub carrier. The wheel may be retained by a conventional threaded fastener engaging a threaded end of the hub carrier. However, quick release mechanisms may be provided between the wheels and their hub carriers.

An example of a bicycle with single-side mounted bicycle wheels and quick release mechanisms is the Gocycle® manufactured by Karbon Kinetics Limited. The quick release mechanism for the Gocycle® single side mounted wheels is described in European patent 1618034.

Each Gocycle® wheel has three quick release levers. A benefit of this arrangement is that it provides a triple redundant safety factor with three quick release levers retaining the wheel to the hub instead of a single quick release lever. Should one quick release mechanism be compromised, there are two remaining quick release mechanisms to retain the wheel to the bicycle wheel hub.

Like traditional double side mounted wheel quick release mechanisms, the single side mounted design of the Gocycle® wheel quick release mechanism allows for each quick release lever to be adjusted from time to time and as required to ensure the clamping force is sufficient. Similarly, like traditional double side mounted wheel quick release mechanisms, in order to ensure the integrity of the quick release mechanism, the user is required to perform a pre-ride safety check of each quick release lever to ensure that they are correctly adjusted and in the closed position. This is done by physically moving each lever out of, and then back to, the closed position to check it has the appropriate tension, and then visually to check that each lever is fully in the closed position. A drawback of this triple redundant design is that with two wheels on the bicycle, the user is required to check six quick release levers by opening and closing each of them in addition to performing a visual check that each lever is closed before riding, and this process can be inconvenient for the user.

Significant inconvenience is involved in checking six quick release levers individually by both physically opening and closing each one as well as visually checking that each one is in the closed position.

The present invention provides a quick-release mechanism for a bicycle wheel that can allow the user to perform a single visual check for each wheel whilst also eliminating the need to open and close each quick release lever, thereby making the required pre-ride safety check more convenient.

The present invention in one aspect provides a quick-release mechanism for a bicycle wheel having one or more levers movable between an engaged position in which the wheel is retained to a hub spindle, and a released position in which the wheel may be removed, the quick-release mechanism including locking means mounted to the bicycle wheel and a movable between a locked position and an open position, wherein when the locking means is in the locked position the locking means is engageable with said one or more the levers to prevent the levers from moving out of their engaged positions.

In an advantageous embodiment, the present invention provides a quick-release mechanism for a bicycle wheel which is mounted to the bicycle frame by a hub spindle attached to the frame at only one of its axial ends, and wherein the quick release mechanism comprises one or more levers movable between a closed position in which the wheel is retained to the hub spindle of the bicycle, and a released position in which the wheel may be removed from the hub spindle of the bicycle, the quick-release mechanism including locking means movable between an open position in which the said one or more levers are movable, and a locked position in which the locking ring prevents the levers from moving out of their closed positions.

In a second aspect of the invention there is provided a bicycle wheel hub assembly including such a quick-release mechanism.

In a third aspect of the invention the invention there is provided a bicycle wheel including such a quick-release mechanism.

In a fourth aspect of the invention, there is provided a bicycle having at least one wheel secured to the bicycle frame with such a quick-release mechanism.

The locking means may comprise a locking ring that engages mechanically with respective quick release lever locking pins provided on each of the quick release levers when the levers are in their closed positions, to prevent the levers from moving out of their closed positions.

The locking ring may be rotatable about the central axis of the wheel between a locked position and an open position, and may be mounted so as to be freely rotatable relative to a wheel quick release lever cover. A locking ring retainer may be provided to secure the locking ring to the lever cover.

Preferably, the locking ring is provided with latching means co-operable with a detent on the lever cover or the bicycle wheel, the latching means being operable to retain the locking ring in its locked position. The latching means serves to prevent the locking ring from rotating to the open position during normal riding.

The quick-release mechanism is preferably provided with a visual indicator so that the user can determine from a visual inspection of the mechanism whether the locking ring is in the locked or the open position.

The locking ring may be formed with three locking ring hook features such that when the quick release levers are in their closed positions and the locking ring is rotated to the locked position, each locking ring hook feature engages with a respective quick release lever locking pin such that the quick release levers cannot be moved to their released positions inadvertently.

The locking ring has a feature enabling the user to deliberately rotate the locking ring by hand to a locked or un-locked position. To open the quick release levers, the locking ring is rotated by the user to the un-locked position overcoming by appropriate force the opening prevention feature and confirmed by the locked and un-locked visual key feature to be in the un-locked position, the locking ring hook features are simultaneously disengaged with all three quick release locking pins allowing for the quick release levers to be opened and the bicycle wheel to be detached from the bicycle wheel hub.

Because the locking ring is one homogenous component and able to engage or disengage with all three quick release levers simultaneously, this invention provides a new and improved single side mounted wheel quick release mechanism whereby the user's pre-ride inspection of the wheel quick release mechanism can be far more convenient with a single visual check to confirm that the locking ring is in the locked position and being assured that all quick release levers are retained and in a closed position appropriate for safe riding.

A preferred embodiment of the invention will now be described with reference to the accompanying drawings in which.

Figure 1:
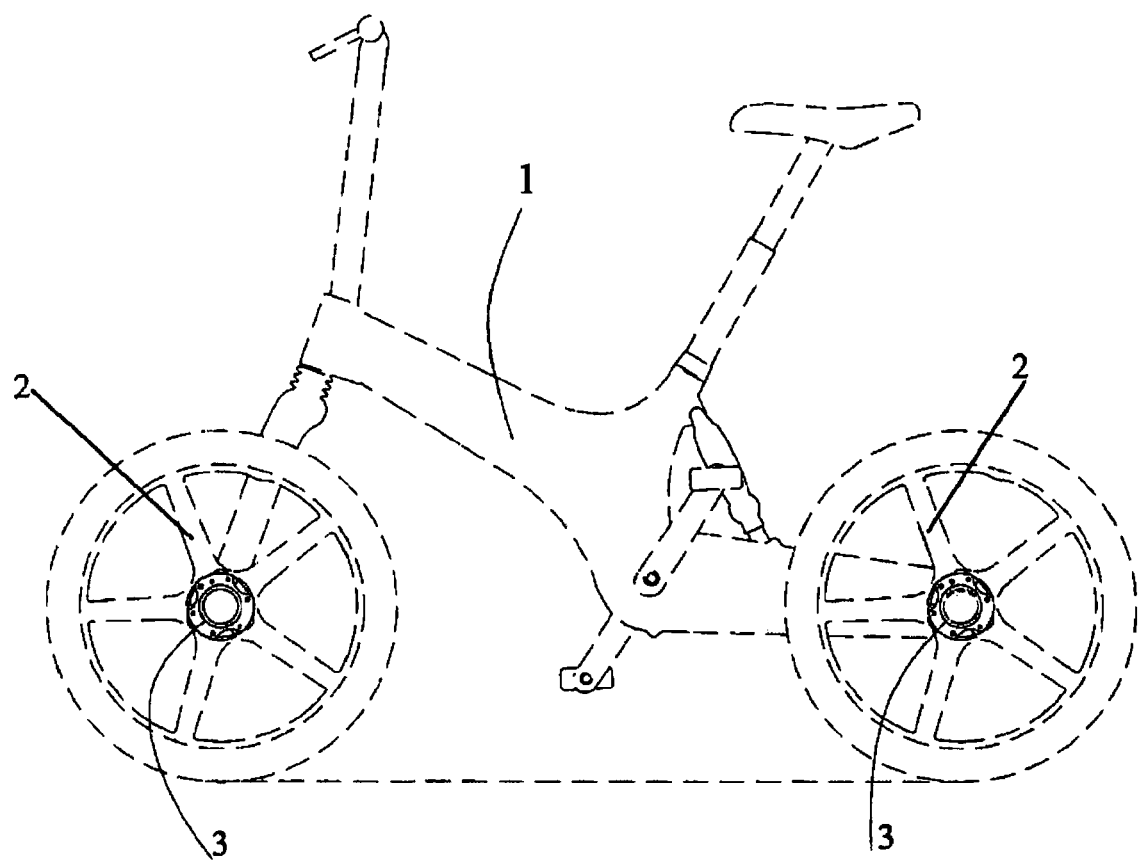
FIG. 1 is a perspective view of a bicycle incorporating a quick-release mechanism according to the invention.

Referring now to the drawings, FIG. 1 illustrates a bicycle frame 1 with single-side mounted bicycle wheels 2 attached to the bicycle frame 1 by quick release mechanisms 3.

Figure 2:
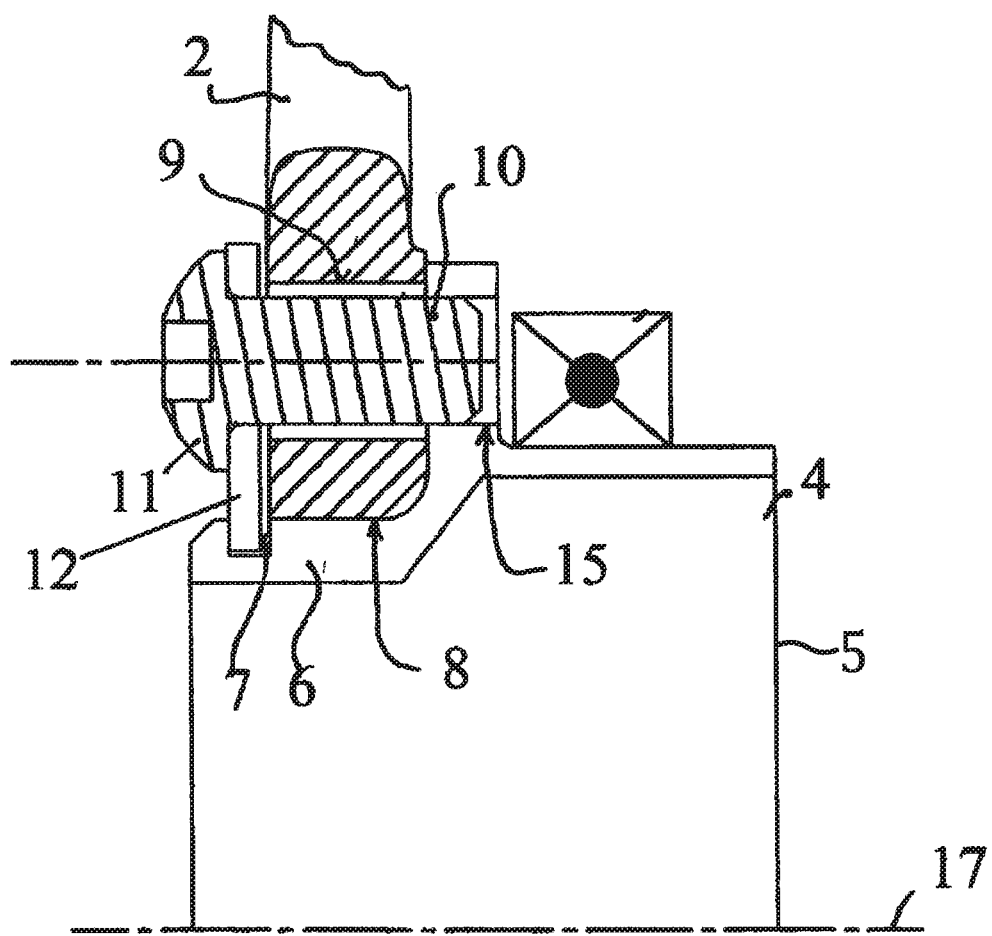
FIGS. 2 and 3 are sectional and perspective views, respectively, showing a quick-release mechanism of the prior art.
Figure 3:
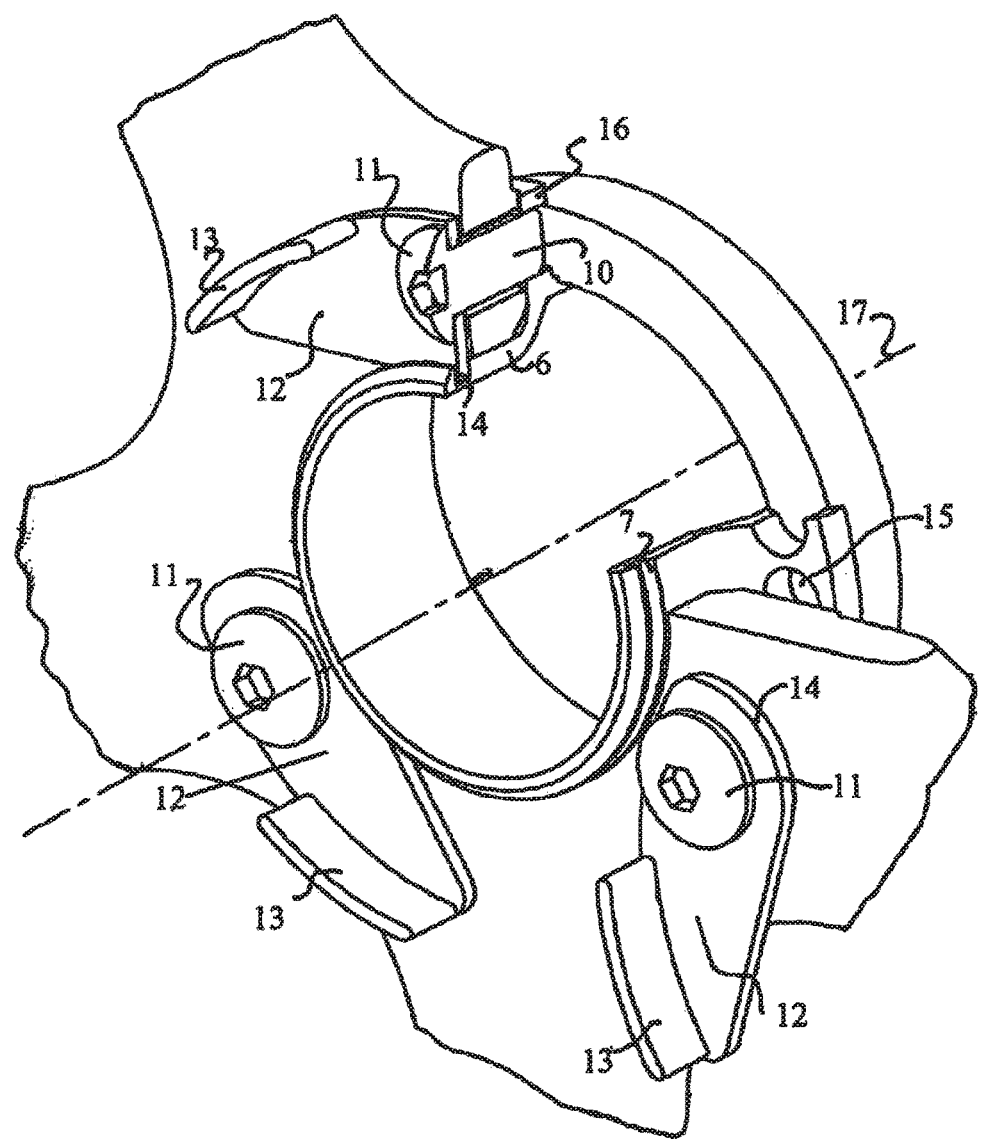

FIGS. 2 and 3 are sectional and perspective views, respectively, of a prior art arrangement for mounting a bicycle wheel 2 to a hub spindle of a bicycle which includes a gearbox 4, as described in European Patent 1618034. The hub spindle is mounted to the bicycle frame at only one of its axial ends, leaving the other axial end free for mounting and dismounting the wheel without disturbing the connection between the hub spindle and the bicycle frame.

In the arrangement shown in FIGS. 2 and 3, an outer casing 5 of a hub gearbox 4 is formed at its free end with a protruding cylindrical section 6 having a circumferential external groove 7. The bicycle wheel 2 is formed with a central bore 8 which closely engages the outer surface of the cylindrical section 6 of the hub. Adjacent the bore 8, the wheel 2 is provided with three threaded bores 9, through which threaded fasteners 10 extend. The threaded fasteners 10 have an enlarged head 11 at one end, to which an operating lever 12 is attached. The ends of the fasteners 10 remote from their heads 11 protrude beyond the threaded bore 9.

The operating levers 12 have a grip portion 13 at one end, and an engaging lobe 14 adjacent the head 11 of the fastener 10. The operating levers 12 are each movable between a released position in which the lever extends substantially radially with respect to the wheel, and a closed position in which the lever extends substantially circumferentially in relation to the wheel.

To mount the wheel to the hub gearbox, the operating levers 12 are moved to their released positions and the wheel is offered up so that the protruding cylindrical section 6 enters the bore 8 of the wheel 2. The wheel is then aligned with the outer casing 5, so that the protruding ends of the fasteners 10 enter clearance openings 15 in a flange 16 surrounding the base of the cylindrical protruding section 6 of the outer casing 5 of the gearbox. The operating levers 12 are then rotated by means of the gripping portions 13 to their closed positions, so that the engagement lobes 14 of the levers 12 engage the circumferential groove 7. As the levers 12 are rotated with the engaging lobes 14 in the groove 7, the threaded engagement between the fasteners 10 and the threaded bores 9 causes the wheel 2 to be clamped securely onto the flange 16, as the fasteners 10 are withdrawn from the threaded bores 9 with the engagement lobes 14 in contact with the wall of the groove 7.

The wheel is released from the hub 5 by rotating the levers 12 to their released positions (in the clockwise direction as seen in FIG. 3), in order to withdraw the engagement lobes 14 from the groove 7. The wheel 2 can then be removed axially relative to the hub 5 along the wheel axis direction 17.

As will be appreciated, to check the security of the mounting of the wheel to the hub, each of the three levers 12 must be checked for correct positioning and correct tension.

Referring now to FIGS. 4 to 8, there is illustrated a quick-release mechanism of the type described above and further including a releasable locking means according to the invention for retaining the operating levers 12 in their closed positions. In the following description, like reference numerals will be used to describe parts of the assembly corresponding to those illustrated in FIGS. 2 and 3.

Figure 8:
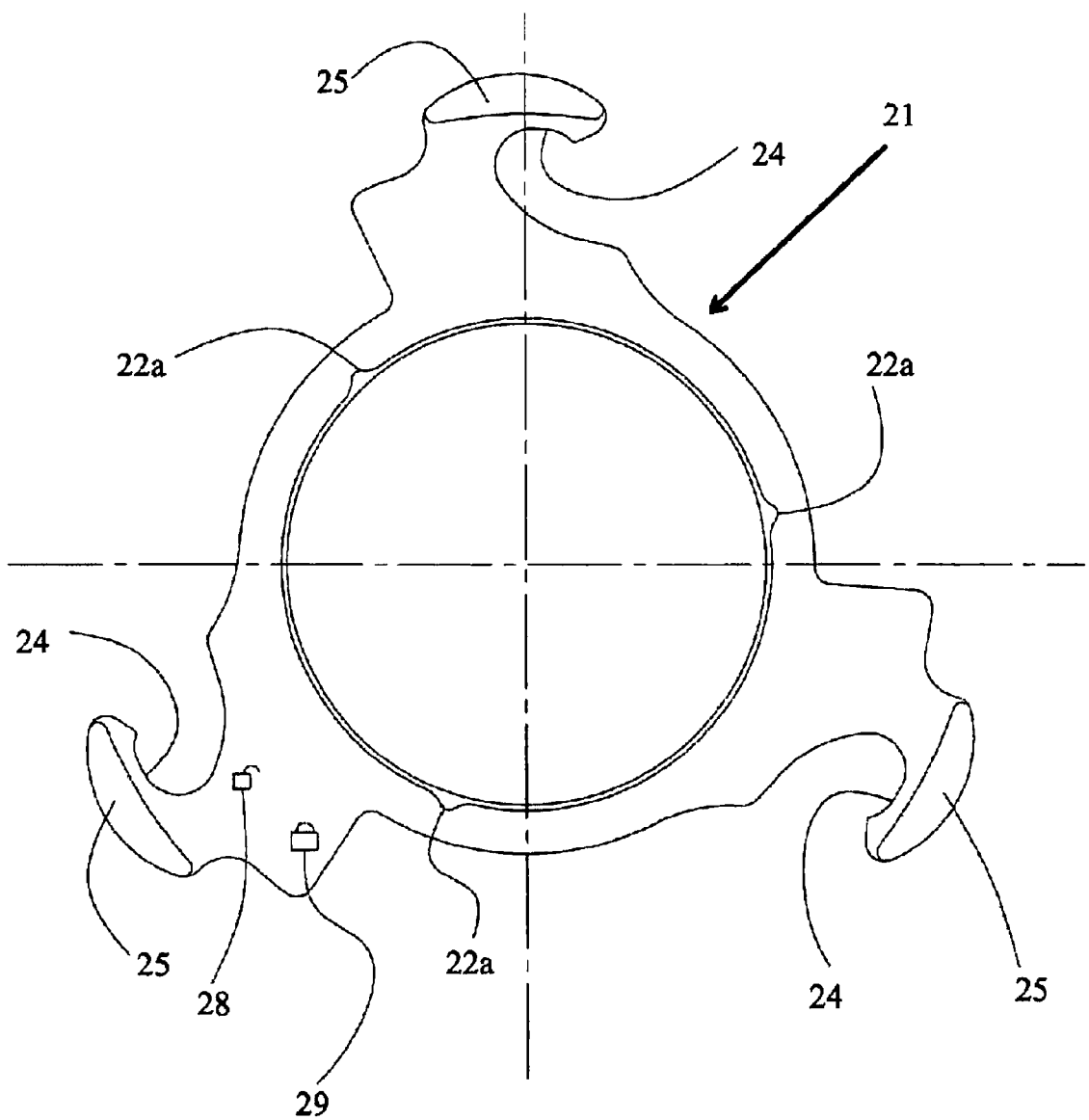
FIG. 8 is a front view of the locking ring.

In the illustrated embodiment, the quick release mechanism comprises a wheel quick release lever cover 18 which is a plate attached to the bicycle wheel 2 by three mounting screws 19. The three quick release levers 12 are positioned between the cover 18 and the wheel 2, and are rotatable about respective pivot pins 20 mounted to the wheel. The pivot pins 20 may extend out of the wheel 2 and into openings in the cover plate 18. The lever cover 18 has a circular central opening 18a coaxial with the wheel axis 17, as seen in FIG. 8.

Figure 4:
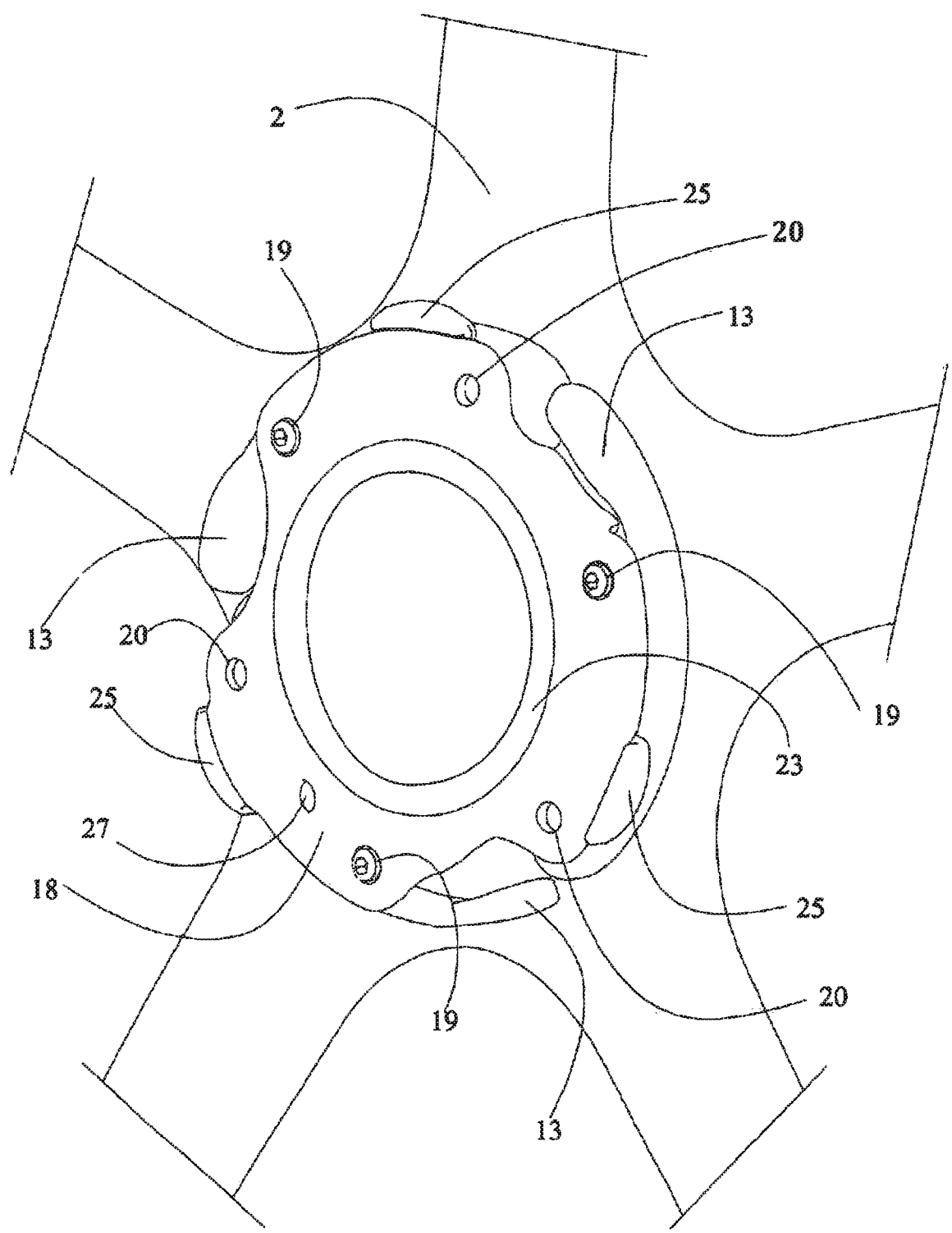
FIG. 4 is a perspective view of a quick-release mechanism according to the invention including a latching means.
Figure 5:
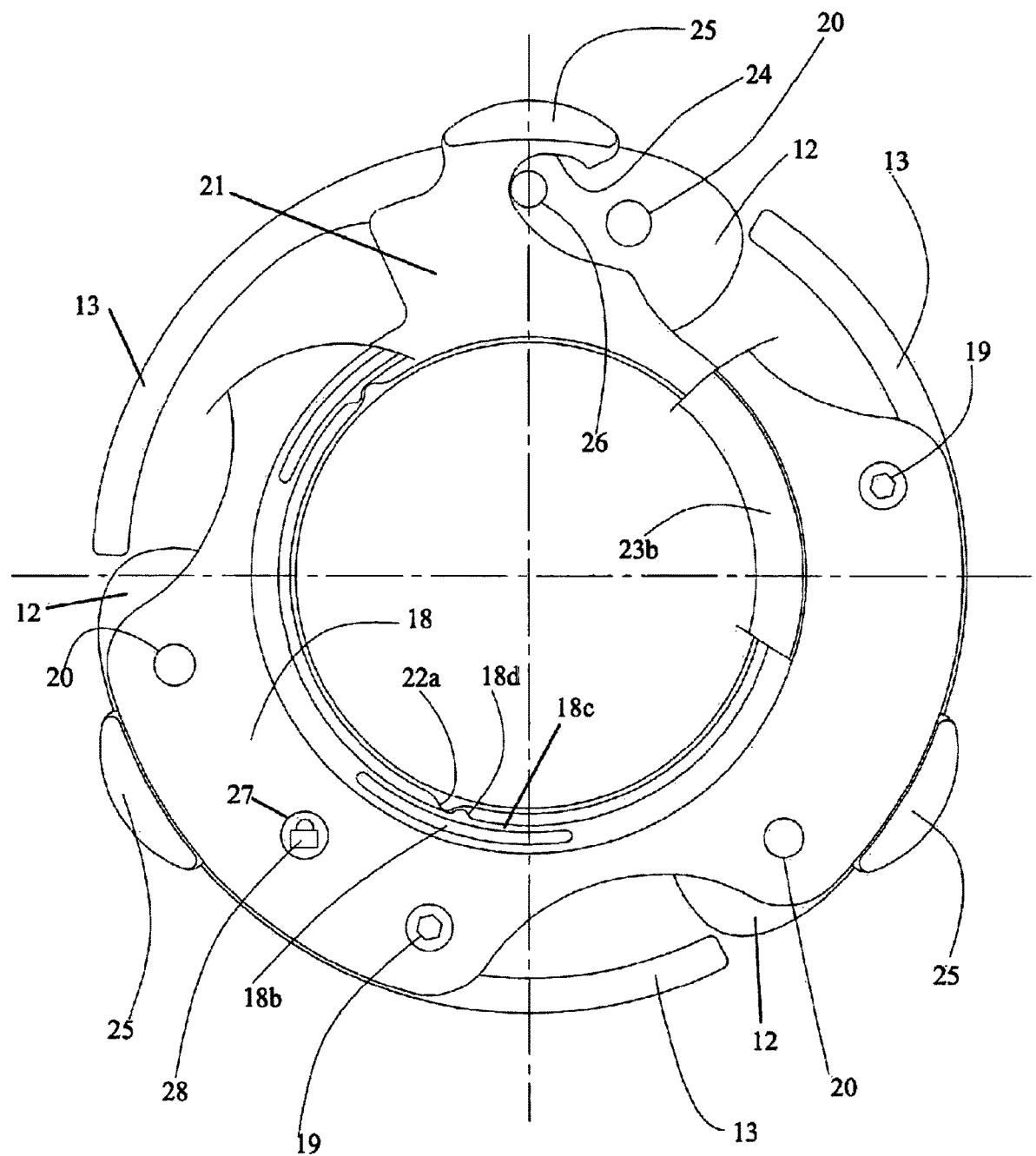
FIG. 5 is a front view of the quick-release mechanism according to the invention with the locking ring in the closed position.

In FIGS. 4 and 5, the quick release levers 12 are shown in their closed positions and can be moved to their released positions by rotating each lever 12 clockwise about its pivot 20.

A locking ring 21 is rotatably mounted to the lever cover 18. The locking ring 21 has a central flange 22 which is received in the opening 18a of the lever cover 18. The central flange 22 includes three radially outwardly extending nibs 22a, whose function will be described below. The nibs 22a engage the opening 18a of the lever cover 18 to locate the locking ring for rotation relative to the lever cover 18.

The lever cover 18 is formed with three circumferentially-extending slots 18b adjacent the central opening 18a, defining flexible ribs 18c between each slot and the central opening 18a. Intermediate the length of each rib 18c is an inwardly-projecting detent 18d. As the locking ring 21 is moved from a "locked" to an "open" position, each of the nibs 22a engages a detent 18d and urges it radially outwardly, flexing the rib 18c. After the nib 22a has passed the detent 18d, the resilient rib 18c returns the detent 18d to its radially inward position, preventing the locking ring 21 from moving to its alternative position unassisted. The engagement between the nibs 22a and the detents 18d constitutes a latching means which retains the locking ring in either its "locked" or its "open" position. It is foreseen that the flange 22 may be provided with two nibs 22a to engage each one of the detents 18d, such that when the locking ring 21 is in its "locked" position one of the nibs 22a engages the detent 18d to retain the locking ring in this position, and when the locking ring 21 is in its "open" position the other of the nibs 22a engages the detent 18d to retain the locking ring in this position. Alternatively, one of the nibs 22a may be engageable with two detents 18d to respectively retain the locking ring 21 in its two positions. Other latching devices, such as an over-centre spring or a spring-loaded detent are foreseen to retain the locking ring in its "open" or its "locked" position.

In an alternative embodiment, the lever cover 18 may be formed with more or fewer than three circumferentially-extending slots 18b, and the flange 22 of the locking ring 21 may be formed with correspondingly more or fewer nibs 22a.

A locking ring retainer 23 has an axial flange 23a and a radial flange 23b, the axial flange 23a engaging within the flange 22 of the locking ring 21 to secure the retainer 23 to the locking ring 21. The radial flange 23b extends outward to engage the exposed side of the lever cover 18 to retain the locking ring 21 to the lever cover 18 such that locking ring 21 can be moved clockwise or anti-clockwise around the rotational axis 17 of bicycle wheel 2. Locking ring 21 and locking ring retainer 23 are preferably made of light weight metal alloy such as aluminium, but could be made from suitable plastics material, for example by injection moulding. Locking ring retainer 23 and locking ring 21 are preferably connected rigidly by interference press fitting together the flanges 22 and 23a, or they may be connected by cooperating screw threads, by welding or by moulding or adhesive.

The locking ring 21 has three circumferentially-directed hook features 24 arranged around its outer circumference and best seen in FIG. 8. At the radially outermost end of each hook feature, an operating grip 25 is formed, extending toward the radially outer edge of the lever cover 18. The operating grips 25 enable the user to rotate the locking ring between its open and closed positions In the illustrated embodiment, each of the levers 12 includes a lock pin 26 extending from the lever 12 into the plane of the locking ring 21. The lock pin 26 of each lever 12 is so positioned that, when the lever 12 is in its closed position and the locking ring 21 is in the "locked" position seen in FIG. 5, the lock pin 26 is engaged in the hook 24 of the locking ring 21. In this position, the release levers 12 are prevented from leaving their closed positions, thus preventing release of the cam lobes 14 of the levers 12 from the groove in the bicycle hub and thereby preventing removal of the wheel.

Figure 6:
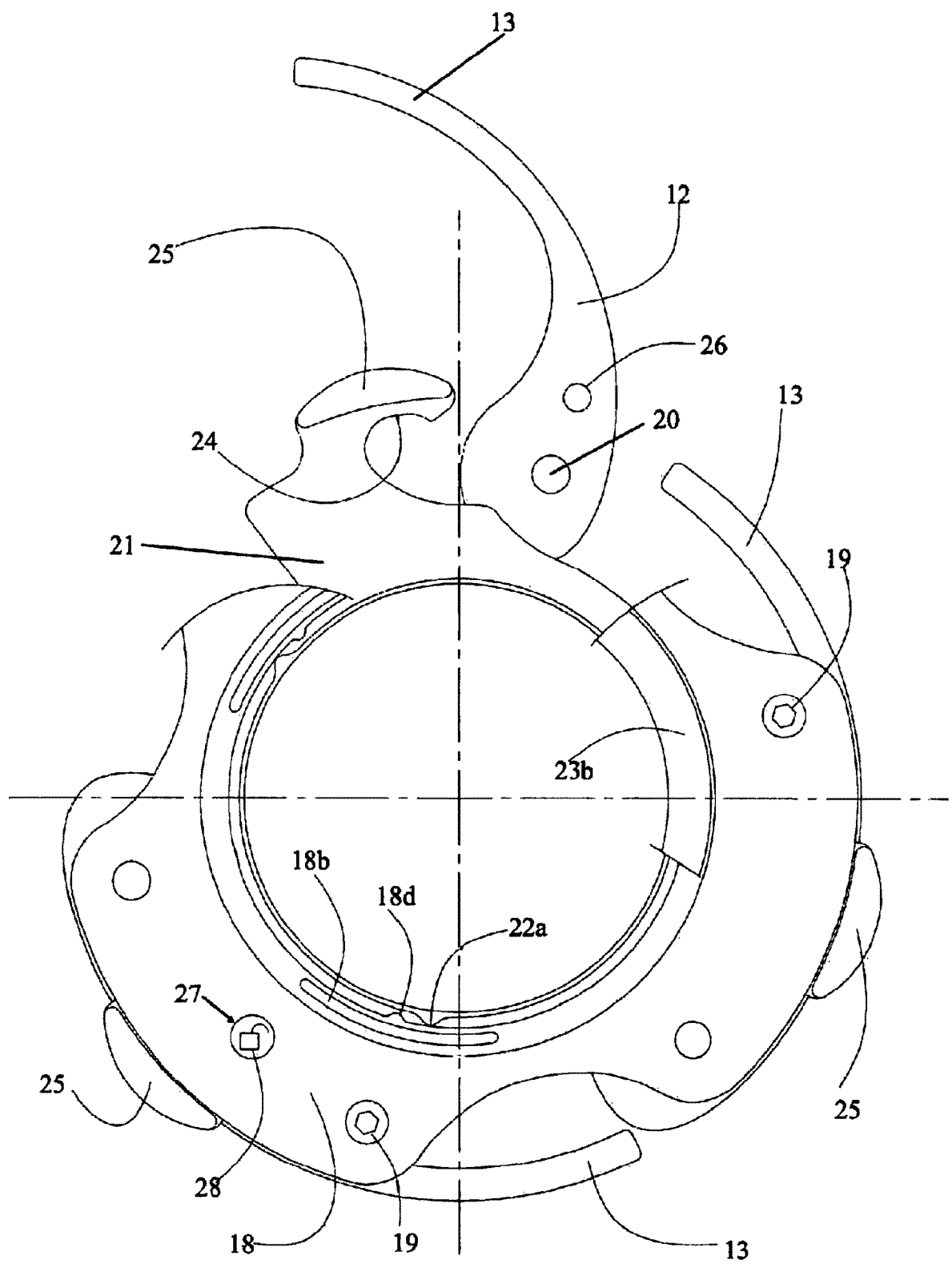
FIG. 6 is a front view of the quick-release mechanism according to the invention with the locking ring in the open position.

Each hook 24 of the locking ring 21 is so formed that, by rotating the locking ring 21 in the anti-clockwise direction to the "open" position seen in FIG. 6, the hooks 24 are moved away from their respective locking pins 26. This permits a user to manually urge the gripping portion 13 of each lever 12 so as to move the lever 12 to its release position, thereby removing the cam lobe 14 from the groove in the bicycle hub and permitting removal of the wheel.

In the illustrated embodiment, quick release lever cover 18 has an opening or visual key window 27, and the locking ring 21 is provided with indicia 28 and 29 positioned so that one of the indicia is visible through visual key window 27 when the locking ring 21 is in its locked position, and the other of the indicia is visible through visual key window 27 when the locking ring 21 is in its open position. The indicia may take the form of graphical indicia such as an open and a closed padlock symbol, a "tick" and a "cross" symbol, or a "thumbs-up" and a "thumbs down" symbol, or may simply be a colour such as a red area and a green area, one of which (for example "tick", "thumbs-up" or green) is visible when the locking ring is in its "locked" position and the other of which (for example "cross", "thumbs down", or red) visible when the locking ring is in its "open" position.

In the front view of FIG. 5, the release levers 12 are shown in their closed positions, and the locking ring 21 is in its "locked" position with the three locking ring hook features 24 each preventing radially outward movement of a respective quick release lock pin 26, to prevent movement of the quick release levers 12 out of their closed positions. In this position of the locking ring 21, the "closed padlock" indicium 29 is visible through the window 27.

In the front view of FIG. 6, the locking ring 21 has been rotated anti-clockwise from the locked position of FIG. 5 to an "open" position. During this movement, the nib 22a engages, deflects and then moves past the detent 18d. The lock pins 26 of the release levers 12 are disengaged from the hooks 24 and thus are not prevented from moving radially outward by the hooks 24. The quick release levers 21 are free to be radially rotated clockwise about their respective pivots 20 to their "open" positions, the uppermost (in the Figure) release lever 12 being shown in the open position. By rotating all three of the release levers to their open positions, the engagement between the wheel and the bicycle hub is released and the wheel may be removed. The release lever cover 18 has a window 27 such that visual "unlocked padlock" indicium 28 is viewable through visual key window 27 when the locking ring 21 is in this open position. The indicia 28 and 29 are preferably laser etched onto locking ring 21, but may be applied or formed by any suitable alternative means such as painting, screen printing, stamping or moulding.

The radially inner edge of the wheel quick release lever cover 18 is shown encapsulated by locking ring 21 and locking ring retainer 23. The wheel quick release lever cover is fixed to the bicycle wheel by mounting screws 19 and is shaped so as to substantially cover the quick release levers 12 when they are in their closed positions.

Figure 7:
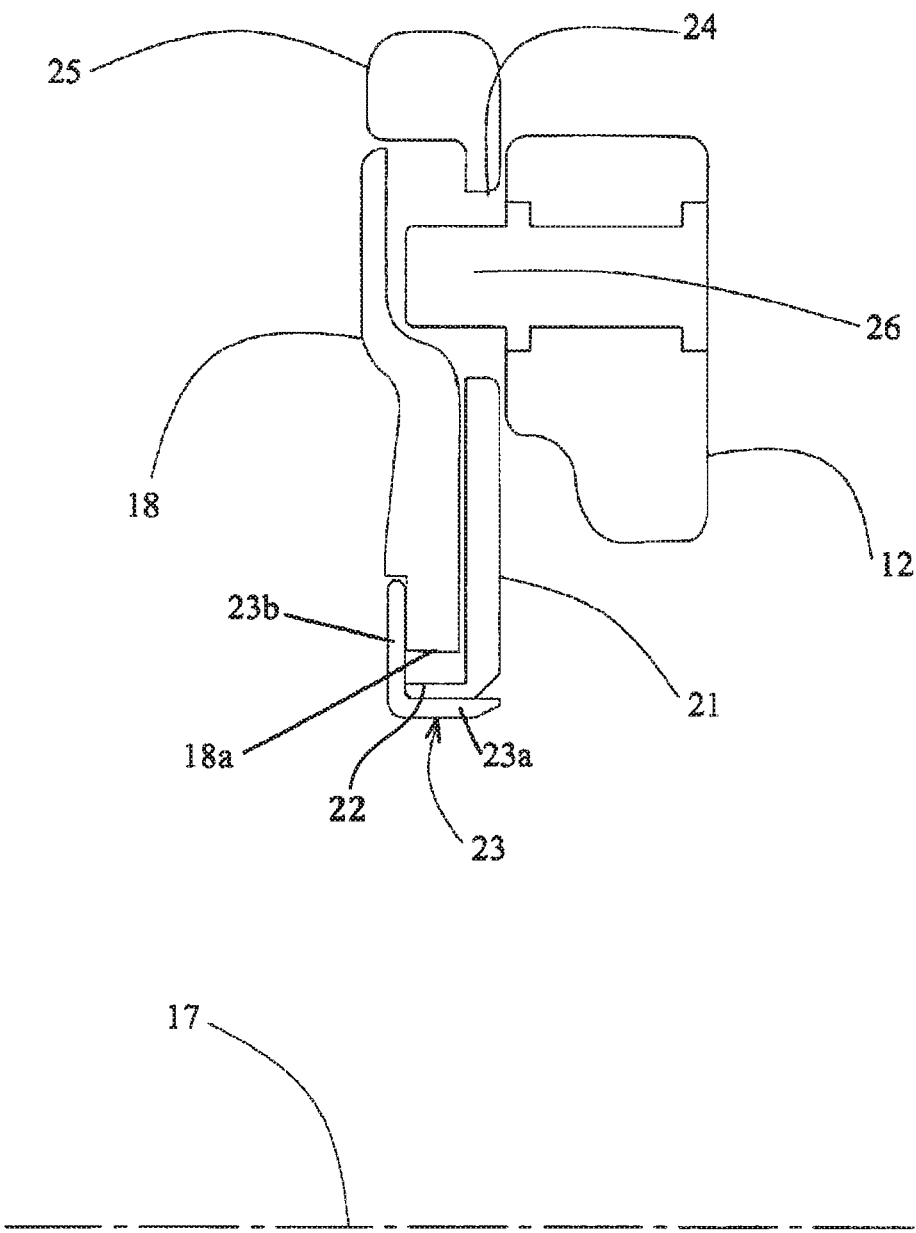
FIG. 7 is a cross section view of the quick-release mechanism according to the invention showing the locking ring hook feature and the quick release lever locking pin.

As shown in the cross section view FIG. 7, locking ring 21 is shown rigidly connected to locking ring retainer 23 and enclosing the inner radial edge of wheel quick release lever cover 18 such that locking ring 21 and locking ring retainer 23 are rotatable with respect to wheel quick release lever cover 18 about wheel rotation axis 17. Quick release lock pin 26 is shown connected to closed quick release lever 12 with quick release lock pin 26 having a substantially cylindrical profile and protruding from closed quick release lever 12 such that locking ring hook feature 24 can be substantially engaged with quick release lock pin 26. Quick release lock pin 26 ideally is connected with closed quick release lever 12 through a moulded in process or by threaded fastening or adhesive. Locking ring retainer 23 and locking ring 21 may be connected rigidly by interference press fitting together or by welding or moulding or adhesive.

The invention claimed is:

1. A quick-release mechanism for a bicycle wheel having one or more levers movable between an engaged position in which the wheel is retained to a hub spindle, and a released position in which the wheel may be removed from the hub spindle,
the quick-release mechanism including locking means mounted to the bicycle wheel and movable between a locked position and an open position, wherein when the locking means is in the locked position the locking means is engageable with said one or more the levers to prevent the levers from moving out of the engaged position; and
wherein the locking means comprises a locking ring formed with circumferentially-extending hooks, and wherein a respective locking pin is provided on each of the quick release levers, wherein when the release levers are in closed positions, the hooks of the locking ring are engageable with the locking pins to prevent the release levers from moving out of the closed positions.

2. The quick-release mechanism according to claim 1, wherein the locking ring is rotatable about the central axis of the wheel between a locked position and an open position.

3. The quick-release mechanism according to claim 1, wherein a lever cover is mounted to the wheel so as to partially cover the release levers when in the closed positions, and the locking ring is mounted on the lever cover so as to be freely rotatable relative to the lever cover.

4. The quick-release mechanism according to claim 2, wherein a locking ring retainer is provided to secure the locking ring to the lever cover.

5. The quick-release mechanism according to claim 2, further including a visual indicator to indicate whether the locking ring is in the locked or the open position.

6. A quick-release mechanism for a bicycle wheel which is mounted to a bicycle frame by a hub spindle attached at only one of the hub spindle's ends to the frame, and wherein the quick release mechanism comprises one or more levers movable between a closed position in which the wheel is retained to the hub spindle of the bicycle, and a released position in which the wheel may be removed from the hub spindle of the bicycle, the quick-release mechanism including locking means movable between an open position in which the said one or more levers are movable, and a locked position in which a locking ring prevents the levers from moving out of closed positions; and
wherein the locking means comprises a locking ring formed with circumferentially-extending hooks, and wherein a respective locking pin is provided on each of the quick release levers, wherein when the release levers are in closed positions, the hooks of the locking ring are engageable with the locking pins to prevent the release levers from moving out of the closed positions.

7. The quick-release mechanism according to claim 6, wherein the locking ring is rotatable about the central axis of the wheel between a locked position and an open position.

8. The quick-release mechanism according to claim 6, wherein a lever cover is mounted to the wheel so as to partially cover the release levers when in the closed positions, and the locking ring is mounted on the lever cover so as to be freely rotatable relative to the lever cover.

9. The quick-release mechanism according to claim 6, wherein a locking ring retainer is provided to secure the locking ring to the lever cover.

10. The quick-release mechanism according to claim 6, further including latching means operable between the locking ring and the lever cover to retain the locking ring in the locked position.

11. The quick-release mechanism according to claim 6, further including a visual indicator to indicate whether the locking ring is in the locked or the open position.

12. A bicycle wheel hub including a quick-release mechanism according to claim 1.

13. A bicycle wheel including a quick-release mechanism according to claim 1.

14. A bicycle having a bicycle frame and two wheels, wherein at least one of said wheels is secured to the bicycle frame by a quick-release mechanism according to claim 1.

15. A bicycle wheel hub including a quick-release mechanism according to claim 6.

16. A bicycle wheel including a quick-release mechanism according to claim 6.

17. A bicycle having a bicycle frame and two wheels, wherein at least one of said wheels is secured to the bicycle frame by a quick-release mechanism according to claim 6.

\* \* \* \* \*